MULTIPLEXING VOICE STORAGE READOUT SYSTEM

Filed May 18, 1967

3 Sheets-Sheet 1

INVENTORS
DAVID H. SHEPARD
ALAN L. GOLDMAN
BY Cushman, Darby & Cushman
ATTORNEYS

MULTIPLEXING VOICE STORAGE READOUT SYSTEM

Filed May 18, 1967

3 Sheets-Sheet 2

INVENTORS
DAVID H. SHEPARD
BY ALAN L. GOLDMAN
Cushman, Darby & Cushman
ATTORNEYS

MULTIPLEXING VOICE STORAGE READOUT SYSTEM

Filed May 18, 1967 3 Sheets-Sheet 3

INVENTORS
DAVID H. SHEPARD
BY ALAN L. GOLDMAN
Cushman, Darby & Cushman
ATTORNEYS

United States Patent Office 3,534,171

Patented Oct. 13, 1970

3,534,171

MULTIPLEXING VOICE STORAGE READOUT SYSTEM

David H. Shepard, Rye, and Alan L. Goldman, Suffern, N.Y., assignors to Cognitronics Corporation, Briarcliff Manor, N.Y., a corporation of New York Filed May 18, 1967, Ser. No. 639,417

Int. Cl. H04m *11/08*

U.S. Cl. 179—1 14 Claims

ABSTRACT OF THE DISCLOSURE

The following specification discloses a multiplexing system for voice encoding apparatus which comprises an audio drum having a plurality of words and phrases thereon in a plurality of discrete tracks, a counter, and sampling means which is adapted to be driven by said counter for periodically and sequentially sampling the information recorded in each of said tracks on said audio drum, means connecting said sample information to an audio bus, a plurality of address registers adapted to receive address information corresponding to the discrete address locations on said audio drum, coincidence detector means associated with each of said address registers for detecting coincidence between the state of said counter and the address information stored in the various address registers, each of said coincidence detector means being effective to connect the signal appearing on the audio bus to the particular output channel associated therewith whenever coincidence occurs.

The present invention relates to voice encoding apparatus for simultaneously producing voice messages on a plurality of channels. More particularly, the present invention concerns apparatus for composing voice messages of digital outputs from suitable data processing equipment.

Recent developments in the telephone communication field have provided systems whereby a plurality of subscribers at remote locations are able to obtain access to a centrally located digital computer for the purpose of obtaining information in response to coded inquires based on the information stored in the digital computer. For example, a digital computer may be provided with constantly updated information regarding the price of all the stocks on a particular exchange. A plurality of remote subscribers are connected via telephone equipment to the central digital computer whereby any particular subscriber may, by transmitting a particular coded message, representative of a particular stock, query the central computer and receive, via the telephone equipment, the updated information concerning the particular stock stored in the computer. These prior art systems have usually provided visual readout means at the remote subscriber station. Audio output at the remote subscriber has also been suggested, however, suitable multiplexing equipment for such voice messages has not been developed.

The present invention provides a modular voice responsive unit suitable for use in the above described communications systems which is responsive to the coded digital output from the computer to provide an audible voice message representative of the coded answer provided by the computer. The present invention further provides a multiplexing arrangement whereby a plurality of subscribers may simultanesously receive voice messages in response to their coded inquiries. The present invention also provides a voice responsive unit which is readily expandable to service any number of remote subscribers.

In accordance with a preferred embodiment of the present invention the voice response unit comprises a line expander unit and common module. The common module contains an audio drum having a plurality of recording tracks thereon, each having a discrete address location. All of the words and phrases required by the system in order to produce voice message responses are recorded on separate ones of these tracks. The common module also contains means for sequentially and periodically sampling the audio information and for presenting the sampled information in series form to an audio bus. The sampling means mentioned above is adapted to be driven by a counter which is cyclically incremented through its various states.

The line expander unit comprises one or more 10-line expander modules, depending on the number of remote subscribers to be served. Each 10-line expander provides simultaneous voice messages to 10 remote subscriber output lines. Each 10-line expander has 10 address registers, one for each output line, which are adapted to simultaneously receive address information from the data processing unit. A coincidence gate and sample amplifier are provided for each register, the output of each coincidence gate being connected to its associated sample amplifier. The audio bus from the common module is also connected to each sample amplifier. Each of the coincidence gates are connected in such a manner so as to generate an output whenever the count in the counter, located in the common module, is equal to the addresses stored in the register associated with the particular coincidence gate. In this manner, the sampled information from the track on the audio drum corresponding to address stored in any given address register is periodically gated through the sample amplifier to the remote subscriber. The sample amplifiers are effective to integrate the sampled audio signal whereby the output therof is a substantial duplicate of the audio signal appearing on the audio drum.

The audio drum, located in the common module, is also provided with a reference marker track thereon for producing timing signals to control the entry of address information from the computer into the address registers of line expander modules. These timing signals are also effective to suppress audio output from the sample amplifiers during the storage of address information. These timing signals authorize the computer to periodically transmit address information to the address registers. In this manner the central data processing unit, by providing a series of addresses to a particular register in response to an inquiry from the remote subscriber associated with that particular register, is capable of composing a coherent voice message in response to that inquiry.

The present invention further provides suitable maintenance and test apparatus for verifying the operation of the above described voice responsive unit. More complete understanding of the present invention may be had by referring to the following detailed description and the accompanying drawings in which.

Figure 1:
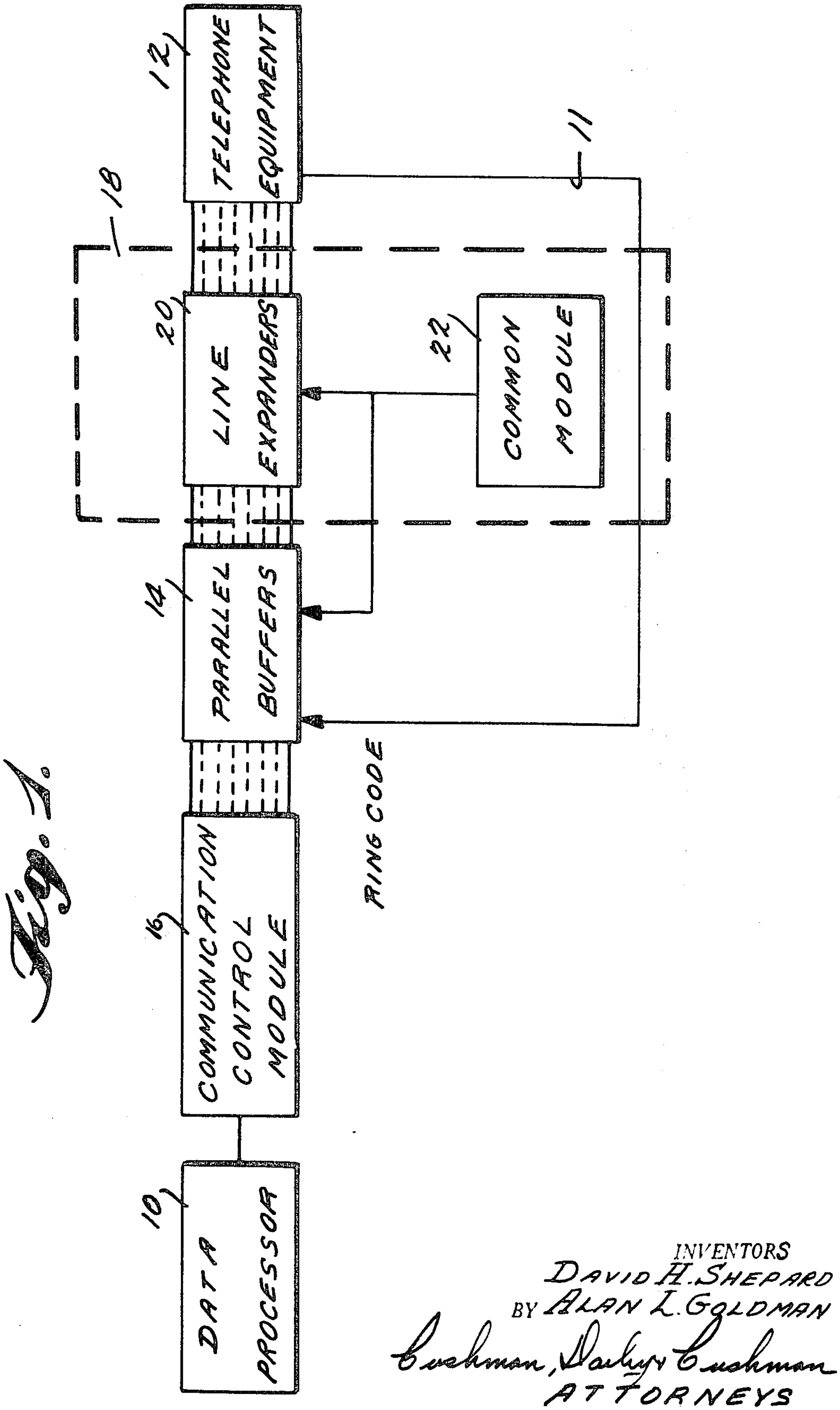
FIG. 1 is a block diagram of a telephone communications system employing the apparatus of the instant invention.

In FIG. 1, a data processing unit 10, which may be a digital computer, has stored therein information concerning any particular subject or subjects desired and is programmed to respond to coded inquiries to provide a digital output based on the information stored therein. Telephone equipment 12 represents a plurality of subscribers located at remote stations, each subscriber being provided with a touch-tone telephone unit, for example. Any particular inquiry by a remote subscriber may be composed by depressing the push-buttons on his telephone unit in a particular sequence. These coded signals are transmitted via suitable telephone lines, schematically represented in FIG. 1 by line 11, to a buffer 14. Buffer 14 is comprised of a plurality of parallel buffers equal, at least to the number of remote subscribers. The buffer 14 sends the coded inquiry data to the central processor unit 10 via a communications control module 16. Buffers 14 and communications control module 16 are well known in the art and are provided to permit multiple access to the data processing equipment and for routing the output response of the data processor to a particular inquiry, through the same channel on which that inquiry was made. The computer, in response to these coded inquiries, sends a series of addresses to the voice responsive unit 18 via the communications control module and the parallel buffers 14. Each address allowing the voice responsive unit to output a corresponding word in audio form over the same telephone line that the input query was made on.

The voice responsive unit 18 comprises a plurality of line expanders 20 (to be described hereinafter) and a common module 22. The common module provides audio and control signals to the line expanders 20 for composing audio messages in accordance with the information received from data processor 10. Timing signals are also generated by the common module 22 and fed to the data processing equipment 10 via the parallel buffers and the communications control module.

Systems of the type described above allow the data processor to respond to inquiries in audio form and are suitable for use in telephone exchanges for giving operators rate and route information. They can also be used in banks to give customers or tellers various account information and may similarly be used by local brokerage houses where various types of information, related to stocks, is desired.

Figure 2:
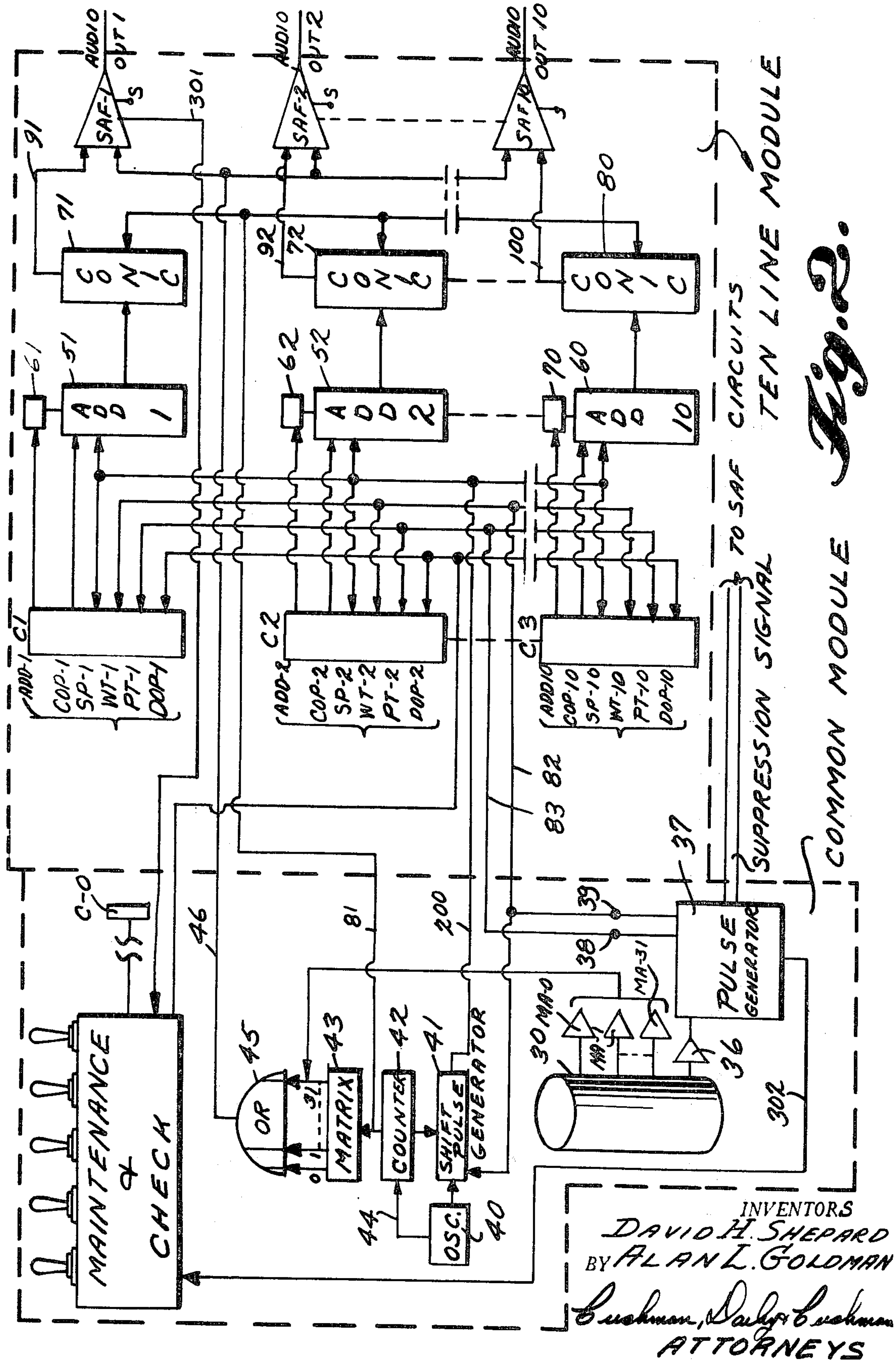
FIG. 2 is a partial schematic of the block diagram of the voice responsive unit of the instant invention.

The voice responsive unit 18 is shown in greater detail in FIG. 2, wherein an audio drum 30 has recorded thereon all the words and phrases that are available to be spoken by the system. In accordance with the preferred embodiment of the present invention, the audio drum is constructed in the manner similar to that shown in United States Pat. No. 3,300,591. The information on the cylinder is recorded on thirty-two data tracks, each track resembling the sound track of a motion picture film. The film utilizes the variable area type of recording which modulates a thin beam of light. At each track, this beam falls on a photocell generating an EMF, which may be amplified and subsequently, time division multiplexed. In addition to the thirty-two data tracks on the cylinder, there is an additional track for reference or timing signals. The details of the audio drum and the photoelectric sensing apparatus are not shown herein in detail as they form no part of the present invention and reference may be had to the aforementioned patent for a more detailed understanding of the audio drum. It is, of course, to be understood that the present invention is not limited to this type of audio storage device, but on the contrary, is equally adaptable to magnetic recording as well as other suitable types of audio storage devices.

The apparatus shown in FIG. 2 is divided into two parts. On the right side there is shown the 10-line module and on the left side the common module, including the audio drum, is illustrated. Each of the thirty-two sound tracks on the audio drum is adapted to have words or phrases recorded thereon as mentioned hereinbefore. The audio information is stored in the film drum in two ways. Individual words such as "zero", "one" and "two", and so forth, are stored on different tracks, each track containing that word three times. Phrase information such as "thank you for calling" is stored on separate tracks. In accordance with the present invention, a plurality of transducers (not shown) such as photocells, are provided, each transducer being associated with one of the plurality of sound tracks. The outputs of the thirty-two transducers associated with the audio information tracks are connected to a plurality of multiplex amplifiers MA–0 to MA–31. The reference marker track, or the timing track of the audio drum is provided with three equally spaced reference marks which signal the beginning of each word or phrase recorded on the drum. The reference mark located adjacent to the film splice marks the beginning of a phrase and is approximately twice as long as the other two reference marks. The output of the reference track is fed through an amplifier 36 into the phrase and word pulse generator 37, which detects the difference between the longer and shorter pulses. Circuits capable of detecting the pulse length differences are well known in the art and therefore will not be explained in detail herein. The output from the pulse generater 37, on line 38, represents a phrase pulse (PT) and the output on line 39 represents a word pulse (WT). In accordance with a preferred embodiment of the present invention, the drum is located at 1.6 revolutions per second and therefore the phrase pulse occurs once every 1.6 seconds and the word pulse occurs every .533 second. The duration of the phrase pulse is selected to be 25 milliseconds and the duration of the word pulse is selected to be 500 microseconds. In this manner, the system is capable of generating message at the rate of 100 words per minute. It will, of course, be obvious that the rate of rotation of the audio drum and the duration of the various pulses may be varied to provide any desired output word frequency.

The basic clock for the multiplex system is created by an oscillator 40 which is selected to have a frequency of 455 kHz. The output of oscillator 40 is connected by lead 44 to a 5-bit counter 42 whereby the counter is driven through a complete cycle once every 70 microseconds. The output of counter 42 is connected to a matrix 43 which is comprised of 32-diode AND gates (not shown). The output of each of the multiple amplifiers MA–0 to MA–31 is connected to respective ones of the 32-diode AND gates. For example, the output of MA–0 is connected to the matrix AND gate whose output is true at count 0. The output of MA–1 is coupled to the matrix AND gate whose output is true at count 1 and similarly down the line to MA–31 which is connected to the output of the matrix AND gate whose output is true at count 31. The output at each of the matrix AND gates is fed to a 32-diode OR gate 45. The output of this OR gate is fed to the sample amplifiers SAF–1 to SAR–10 which are located on the 10-line module, via the audio bus 46.

As previously mentioned, the line expander unit may comprise a plurality of 10-line modules depending on the number of subscribers to be serviced. However, for the purpose of clarity, only one of the 10-line modules is shown in FIG. 2. Each 10-line module is equipped with ten conectors C–1 to C–10 which may be, for example, 25-pin-C-in-type connectors. The connectors provide input and output connections for the 10-line module, and serve to connect the parallel buffers in buffer 14 (FIG. 1) to the 10-line module. The 10-line module shown at the right side of FIG. 2 comprises ten address registers 51 through 60 which are adapted to receive address information from the data processing unit 10 (FIG. 1) through conventional receivers 61 through 70. This address information is adapted to be fed simultaneously to the various address registers in bit-serial line parallel form. The address registers 51 through 60 may be of any suitable form, however, in accordance with a preferred embodiment of the present invention, they take the form of 5-bit flip-flop registers. The outputs of address registers 51 through 60 are connected respectively to coincidence gates 71 through 80. Coincidence gates 71 through 80 are also adapted to receive, via cable 81, the output from 5-bit counter 42 located in the common module. Coincidence gates 71 through 80 are of a conventional and well known type and are adapted to generate an output whenever the count in 5-bit counter 42 is equal to the address stored in the respective address registers. The output of the coincidence gates are connected via leads 91 to 100 to sample amplifiers SAF–1 to SAF–10, respectively. The sample amplifiers are effective to connect to the output terminal thereof, the audio signal existing on bus 46, whenever the address stored in the register associated therewith, is equal to the instantaneous count in the counter 42. In this manner the audio signal, located on the audio drum at a location corresponding to the address stored in register 51, for example, is sampled once every 70 microseconds and integrated by the sample amplifier SAF–1 to substantially exactly reproduce the audio signal.

Figures 3, 4:
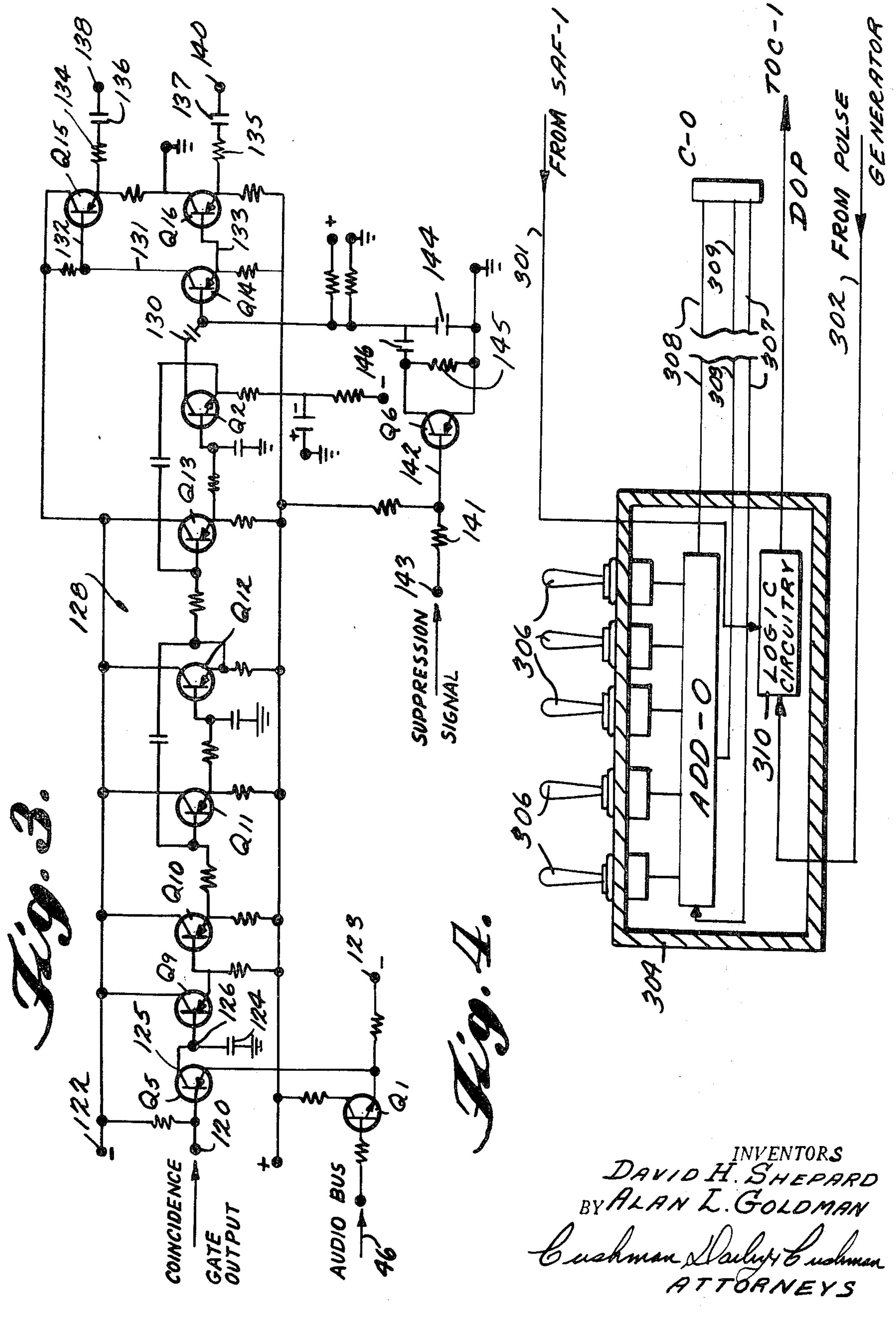
FIG. 3 is a circuit diagram of a suitable sample amplifier for use in the present invention.
FIG. 4 is a block diagram of the maintenance and check circuits suitable for use in combination with the voice responsive unit shown in FIG. 2.

A suitable sample amplifier for accomplishing the foregoing function is shown in FIG. 3 wherein the audio bus signal from the common module is fed into the base of transistor Q1 which is connected as an emitter-follower. The output of coincidence gate 71 is connected to terminal 120 which, in turn, is connected to the base of transistor Q5. Suitable operating (not shown) potential for the sample amplifier is connected to terminals 122 and 123. When coincidence occurs, transistor Q5, which receives the coincidence signal, is saturated and the voltage that exists on the emitter of transistor Q1 is stored on the capacitor 124 which is connected between the collector 125 of transistor Q5 and ground. Connected to the junction 126 of collector 125 and capacitor 124 are two high input impedence emitter-followers comprising transistors Q9 and Q10. The purpose of these emitter-followers is to prevent discharge of capacitor 124 during the 70 microsecond interval between samples and to provide an output to the low pass filter 128. The low pass filiter may be considered to be comprised of four RC low pass filter networks, each separated by an emitter-follower. These emitter-followers are transistors Q11, Q12, Q13 and Q2. Transistor Q2 also serves as a stage of amplification. The amplified audio signal, appearing at the collector of transistor Q2 is connected via lead 130 to the base of transistor Q14 which is used as a phase splitter circuit. The signal existing at the collector of Q14 is fed via leads 131 and 132 to the base of transistor Q15 which is connected as an emitter-follower, and the signal existing at the emitter of Q14 is fed via lead 133 to the base of emitter-follower transistor Q16. In this manner, transistors Q15 and Q16 operate as a push-pull audio output stage, the output of which is fed through resistors 134 and 135 and capacitors 136 and 137 to output terminals 138 and 140. This audio output signal is fed over suitable telephone equipment to the remote subscriber station.

Also associated with the sample amplifier shown in FIG. 3 is suppression circuitry comprising a transistor Q6. The base of transistor Q6 is adapted to receive a suppression signal (to be explained hereinafter) through resistor 141 and lead 142, the aforemetnioned suppression signal being connected to terminal 143. The collector of transistor Q6 is connected via capacitor 146 to the base of transistor Q14. A capacitor 144 is connected from the base of transistor Q14 to ground and resistor 145 is connected across the collector-emitter junction of transistor Q6. At suppression time, transistor Q6 is turned on thereby providing an AC short circuit from the base of transistor Q14 to ground. At all other times, the suppression circuit provides an AC open circuit and therefore has no effect on the sample amplifier. The effect of the AC short circuit during suppression time is effective to prevent any audio signal from reaching output terminals 138 and 140.

Referring again to FIG. 2, a shift pulse generator 41, located in the common module, is connected to the 5-bit counter 42, and oscillator 40 operates shift pulse generator 41 causing it to generate the necessary shift pulses for address registers 51 through 60 and the central data processing unit 10, only during the word and phrase pulses from generator 37. The output of the shift pulse generator is connected via cable means 200 to the various address registers 51 through 60. Output leads SP1 through SP10 are also provided from cable 200 to provide shift pulse information, which may be transmitted via suitable means over the interface between line expander 20 and buffer 14 and thence to the central data processing unit 10.

In operation of the above described apparatus, one microsecond samples of the information recorded in the thirty-two data tracks of the audio drum appear serially on audio bus 46, with a 1.2 microsecond dead space between each sample, a sample from each of the respective recording tracks appearing on the bus once every 70 microseconds.

The phrase pulses and word pulses, appearing at terminals 38 and 39, are connected to connectors C1 and C10 via leads 83 and 82 and are fed over the interface between line expander 20 and buffer 14 by leads WT–1 to WT–10 and PT–1 to PT–10, respectively, and thence to the data processor equipment 10, to authorize the transmission of address information from the computer to the address registers 51 to 60 via address lines ADD–1 to ADD–10, once every .533 second. Prior to the transmission of address information, the computer will raise the computer-power-on-line (COP) to clear the address registers. The phrase time and word time pulses are also fed via a suitable connector means (not shown) to suppression terminal S of each sample amplifier to prevent undesirable noise in the receiver circuit during the time when address information is being stored in the address registers. After the address information has been stored, the suppression signal ceases to thus allow audio information to be transmitted to the various remote subscriber stations.

In order to better understand the operation of the present device, reference will be made to the following example, wherein a coded inquiry is made by the remote subscriber associated with address register 51, the proper answer to such inquiry being "one" "two" "three". In accordance with the example, the remote subscriber will depress the push-buttons on his local telephone receiver in a predetermined sequence. This coded inquiry will be transmitted from telephone equipment via cable 11 to buffer 14, communications control module 16 and data processor unit 10. The data processor unit will generate a sequence of three addresses corresponding to the discrete address of the tracks on the audio drum whereat the words "one" "two" and "three" are stored. When a word pulse is received by the data processor, the first of the three addresses will be transmitted in bit-serial form, to the address register 51 under the control of the shift pulses from shift pulse generator 41. As mentioned before, the word pulse will also suppress any audio signal. The 5-bit counter 42 will sequentially connect one-microsecond samples of the audio signals appearing on each of the thirty-two recording tracks of the audio drum 30 to the audio bus 46. Assuming that the words "one" "two" "three" are located on tracks which are sensed by MA–1, MA–2 and MA–3, respectively, the address stored in address register 51 for the first word of the message will be "one". In this manner, when the 5-bit counter reaches the 1-count state, a one-microsecond sample of the word "one" recorded on the audio drum will be connected to the audio bus 46. At the same time, the coincidence gate 71 will generate an output, since the address in register 51 is equal to the count in counter 42. The sample amplifier circuit (FIG. 3) will therefore store a voltage on capacitor 124 which is proportional to the magnitude of the one-microsecond sample of the audio signal appearing in track one. Each time the counter passes through the one state, therefore, it can be seen that successive one-microsecond samples of the audio word "one" will be gated a 70 microsecond intervals through the sample amplifier SAF–1. The low pass filter circuitry 128 of the sample amplifier will integrate the signal appearing on capacitor 124 to provide a coherent audio signal representative of the word "one". .553 second after the first address was stored, a word pulse will again suppress the audio output and authorize the data processing equipment to transmit the second address, corresponding to the location of the second word of the message. At the end of this word time pulse, the suppression signal will again cease and the word "two," stored in address two, will be generated on the audio output terminal of SAF-1 in the same manner as described above with respect to the first word of the message. The third address will be shifted into the address register 51 during the next word or phrase time pulse and the word "three," appearing in address three, will be transmitted in audio form to the remote subscriber.

The above described operation of the present invention, with regard to a message composed only of words, is the same when phrase information is to be transmitted except that address information, calling for a phrase, must be initiated during the phrase time pulse.

The maintenance and check circuits 300, shown in FIG. 2, are adapted to check the operation of the voice responsive unit, independent of the computer operation, by inserting maintenance cable connector C-0 into one of the input-output connectors C-1 to C-10 of the 10-line module. As shown in FIG. 2, the maintenance and check circuits are adapted to check the operation of the output channel associated with address register 51 by connecting the audio output from SAF-1 to the maintenance and check circuits via lead 301. Phrase pulses from generator 37 are also connected to the maintenance and check circuits by lead 302.

The operation of the check circuits may be understood by referring to the more detailed block diagram shown in FIG. 4 wherein a cabinet 304 is shown as housing the maintenance and check circuitry. Toggle switches 306, which provide a manual address input, are shown as being mounted on the top of cabinet 304. The 5-bit address register ADD-0 is provided in the maintenance and check circuitry and is connected to the toggle switches 306, in such a manner that when a word pulse is received from the 10-line module, through connector C-0 and lead 307, the address information stored in the toggle switches will be entered into the address register in a bit-parallel manner. The address thus stored in the address ADD-0 is read out over line 308 through connector C-0 to address register 51 under the control of shift pulses received from the 10-line module through connector C-0 and lead 309. In this manner, the output from any of the tracks on audio drum 30 may be manually selected and checked for operability. By employing the maintenance cable C-0 to couple address information to the 10-line module and control and shift pulses from the 10-line module to the maintenance check circuitry, the interface between the voice response unit and the buffer 14 (FIG. 1) is substantially duplicated thereby providing an accurate check on the operation of the system. The audio output from SAF-1 (FIG. 2) is connected via lead 301 to logic circuitry 310. Also connected to logic circuitry 310 are phrase pulses from phrase and word generator 37 (FIG. 2) via lead 302. The logic circuitry 310 is comprised of well known logic elements and is effective to develop a device-operable (DOP) output signal whenever both audio information exists on line 301 and the phrase pulses are existing on line 302. The DOP line is connected, as shown in FIG. 2, through connector C-1 to C-10 to the central data processing unit to provide an indication that the voice response unit is operable. If the audio signal should be non-existent or should a single phrase pulse be missed, the output signal on the DOP will cease. Suitable means (not shown) may be provided to give a visual or audio alarm signal to indicate such a failure.

The foregoing description of a preferred embodiment of the present invention is not intended to delimit the scope thereof. On the contrary, it should be apparent to those skilled in the art that this invention is amenable to a variety of modifications with respect to the mechanical components, circuitry and electrical components and hence, may be given embodiments other than those particularly illustrated and described herein without departing from the essential features of the present invention and within the scope of the claims appended hereto.

What is claimed is:

1. Apparatus for selectively composing voice messages in a plurality of channels comprising,
- memory means for storing therein at discrete address locations, message units capable of being transduced into an audio signal,
- counter means for sequentially and periodically counting through a plurality of states corresponding to said discrete address locations,
- sampling means driven by said counter means for periodically and sequentially sampling the message unit in each of said discrete address locations thereby producing message samples,
- a plurality of address registers for said plurality of channels for receiving address information corresponding to said discrete address locations, and
- means associated with each of said address registers for selectively connecting said message samples to one or more of said channels to produce a voice message therein when the state of said counter means corresponds to the address stored in the address registers respectively associated with said one or more of said channels.

2. The apparatus of claim 1 wherein each of said address registers is adapted to receive a sequence of discrete addreses for composing a voice message on its associated channel, said voice message comprising a plurality of said message units.

3. The apparatus of claim 1 wherein said memory means comprises a rotatable audio drum having a plurality of recording channels, each of said channels having a different message unit in audio form recorded therein.

4. The apparatus of claim 3 further comprising a plurality of transducer means disposed in operable relation with respective ones of said plurality of recording channels.

5. The apparatus of claim 1 wherein said means for connecting said message samples to said channels comprises:
- an audio bus coupled to serially receive said message samples,
- a plurality of coincidence gates operatively associated with respective ones of said address registers and said counter means,
- each of said coincidence gates being operative to generate an output the content of its associated address registers corresponds to the instantaneous state of said counter means, and
- a plurality of gate means associated with respective ones of said coincidence gates and said audio bus,
- each of said gate means being operative to connect said audio bus to one of said channels in response to an output signal from its associated coincidence gate.

6. The apparatus of claim 5 wherein each of said gate means comprises:
- a sampling amplifier having a first and second input and an output,
- said first input being connected to a respective one of said coincidence gates,
- said second input being connected to said audio bus, and
- said output being respectively connected to said one of said channels.

7. The apparatus of claim 6 wherein each of said sampling amplifiers further comprises means to integrate said message samples on said audio bus for reproducing said sampled message unit in audio form.

8. The apparatus of claim 1 wherein said memory means further comprises:

means for producing periodic timing pulses for enabling said address registers to simultaneously receive said address information, and means responsive to said timing pulses for suppressing the said connecting of message samples to said channels whenever said address registers are receiving address information.

9. The apparatus of claim 8 further having error detection means comprising means for manually inserting an address into one of said address registers, means for detecting the existence of an audio signal on the channel associated with said address register, means for detecting the existance of said timing pulses, and means for generating an error signal whenever the audio signal is absent or one of said timing signals is missed.

10. In a plural channel data communications system comprising a plurality of remote subscribers, central data processing means, data transmission means for permitting multiple access to said data processing means on a time sharing basis wherein said data processing means is adapted to receive coded inquiries from said remote subscribers and to transmit coded responses to said subscribers, the improvement comprising:

voice response means adapted to receivve said coded responses and convert them into voice responses said voice response means comprising, audio storage means for storing audio messages therein at discrete address locations, means for periodically and sequentially sampling the audio messages in each of said discrete address locations thereby providing message samples, a plurality of address registers associated with respective ones of said remote subscribers, and means for connecting said messsage samples from any one of said discrete address locations to respective ones of said remote subscribers in accordance with said coded responses stored in said address registers associated therewith.

11. The apparatus of claim 10 wherein said sampling means comprises:

a counter for periodically and sequentially counting through a plurality of states corresponding to said discrete address locations, means coupled to said counter for periodically and sequentially sampling the audio messages stored in said discrete address locations in accordance with the instantaneous state of said counter thereby, producing message, samples, and means for serially presenting said message samples to an audio bus.

12. The apparatus of claim 11 wherein said means for connecting said message samples to said remote subscribers comprises:

a plurality of coincidence gates operatively associated with respective ones of said address registers and said counter, each of said coincidence gates being operative to generate an output signal whenever the content of its associated address register corresponds to the instantaneous state of said counter, and a plurality of gate means operatively associated with respective ones of said coincidence gates and said audio bus, each of said gate means being operative to connect said message samples appearing on said audio bus as an audio output to the remote subscribers in response to an output signal from its associated coincidence gate.

13. The apparatus of claim 12 including:

means for producing periodic timing pulses for enabling said address registers to receive said address information, and error detection means for testing the operation of said voice response means independently of said data processing means, said error detection means comprising:

means for manually selecting an address corresponding to one of said discrete address locations, means for transmitting said address to one of said address registers, first receiver means for receiving said audio output on the channel associated with said one address register, second receiver means for receiving said timing pulses, and logic means connected to said first and second receiver means for generating an error signal whenever said audio output fails to occur or one of said timing pulses is missed.

14. A voice response unit having a common module and at least one plural-line module, said common module comprising an audio drum having a plurality of recording tracks thereon at discrete address locations, and a reference track, each of said recording tracks having an audio message component recorded therein, said reference track having timing signals recorded therein, time division multiplexing means including a counter for periodically and sequentially sampling said audio message components, and means responsive to said timing signals for generating a suppression signal, shift pulses and information demand signals, said plural-line module having a plurality of channels, each of said plurality of channels comprising a connector adapted to provide input and output connections to a data processing means, an address register, a coincidence detecting circuit and an audio output gate, means connecting address information through each of said connectors to said address registers, means for connecting said shift pulses to each of said address registers and said connectors for controlling the entry of information therein, means connecting said information demand signals to each of said connectors for transmission to said data processing means, means for connecting said sampled audio message components to each of said audio output gates and means for connecting said counter to said coincidence gates, each of said coincidence gates being effective to gate the sampled audio message component from the recording track on said audio drum corresponding to the address stored in the address registers associated with each of said coincidence gates, and means for connecting said suppression signal to each of said audio signals during the transmission of address information to said address registers.

References Cited

UNITED STATES PATENTS

| | | | |
|---|---|---|---|
| 3,161,732 | 12/1964 | Martin. | |
| 3,337,847 | 8/1967 | Olsson | 340—152 |

RALPH D. BLAKESLEE, Primary Examiner

U.S. Cl. X.R.

197—175; 340—152